United States Patent [19]

Yamada

[11] Patent Number: 4,664,328
[45] Date of Patent: May 12, 1987

[54] MAGNETIC TAPE REEL

[75] Inventor: Takuzi Yamada, Kanagawa, Japan

[73] Assignee: Fuji Photo Film Co., Ltd., Kanagawa, Japan

[21] Appl. No.: 793,036

[22] Filed: Oct. 30, 1985

[30] Foreign Application Priority Data

Oct. 30, 1984 [JP] Japan .................. 59-163027[U]

[51] Int. Cl.$^4$ .......................................... B65H 75/18
[52] U.S. Cl. ..................................... 242/71.8; 242/68.5
[58] Field of Search .................. 242/71.8, 68.5, 68.6, 242/118.4, 118.8

[56] References Cited

U.S. PATENT DOCUMENTS

| 4,083,508 | 4/1978 | Pattillo | 242/71.8 X |
| 4,083,509 | 4/1978 | Vasudeva et al. | 242/71.8 |
| 4,088,278 | 5/1978 | Adair | 242/71.8 |
| 4,327,879 | 5/1982 | Tanny | 242/71.8 |

*Primary Examiner*—John M. Jillions
*Attorney, Agent, or Firm*—Sughrue, Mion, Zinn, Macpeak and Seas

[57] ABSTRACT

A tape reel for a magnetic tape cassette having an improved circularity of the tape winding cylinder wall and which is more durable than conventional reels. The reel includes an inner cylinder having pawls which engage with a rotating shaft, an outer cylinder provided outside the inner cylinder and coaxial therewith to provide a tape winding cylinder, a plurality of reinforcing ribs extending between the inner and outer cylinders, an intermediate cylinder crossing the reinforcing ribs, and a plurality of intermediate ribs connecting the outer cylinder and the intermediate cylinder in such a manner that at least one intermediate rib is disposed between adjacent reinforcing ribs. The reel may be molded from polyacetal plastic resin without substantial deformation in the molding process, while simultaneously attaining an improved wear resistance.

4 Claims, 2 Drawing Figures

MAGNETIC TAPE REEL

BACKGROUND OF THE INVENTION

The present invention relates to a magnetic tape reel for a magnetic tape cassette.

Heretofore, in a video tape cassette, the magnetic tape is wound on a pair of magnetic tape reels and is incorporated in the cassette case. In these cassettes, a magnetic tape winding drum is made up of an inner cylinder coupled to a rotating shaft, an outer cylinder disposed outside the inner cylinder and providing a tape winding cylindrical wall, and a plurality of reinforcing ribs extending radially of the reel to connect the outer cylinder and the inner cylinder. The tape winding drum has upper and lower flanges to prevent the magnetic tape from being wound irregularly.

The reinforcing ribs extending radially of the reel are necessary for increasing the mechanical strength of the tape winding drum and for facilitating the flow of molten plastic resin in molding the reel. However, the resin contracts immediately after the molding of the reel, and thus the ribs tend to be contracted towards the center axis of the reel more than the other parts. As a result, the circularity or cylindricity of the tape winding drum is often less than desired.

In order to overcome the above-described difficulty, there have been proposed a variety of reels. For instance, in a reel disclosed by Japanese Published Utility Model Application No. 28313/1982, two spaces define an S shape in a horizontal section of the inner cylinder coupled to the rotating shaft and the outer cylinder providing the tape winding cylindrical wall. That is, the outer cylinder is of a dual structure having a certain space, and the reinforcing ribs are connected to the inner wall of the outer cylinder, but are not connected directly to the outer wall forming the tape winding cylindrical wall. Accordingly, the contraction of the reinforcing ribs during cooling of the molten resin is absorbed by the inner wall, whereby the circularity of the tape winding drum is maintained.

If the reel disclosed by Japanese Published Utility Model Application No. 28313/1982 is made of a resin such as acrylonitrile butadiene styrene (ABS) resin which has a relatively small contraction when cooled, the effect is sufficient. However, if it is made of a resin such as polyacetal (POM), there is still a problem.

SUMMARY OF THE INVENTION

In view of the foregoing, an object of the invention is to provide a magnetic tape reel in which the circularity of the tape winding drum is positively maintained, even if the reel is made of a plastic resin which contracts relatively greatly when molded.

The foregoing object and other objects of the invention have been achieved by the provision of a reel on which a magnetic tape is wound, in which, according to the invention, the tape winding drum thereof comprises: an inner cylinder having pawls which are engaged with a rotating shaft; an outer cylinder provided outside the inner cylinder in such a manner that the outer cylinder is coaxial with the inner cylinder, the outer cylinder providing a tape winding cylindrical wall; a plurality of reinforcing ribs extending radially of the reel to connect the outer cylinder to the inner cylinder; an intermediate cylinder disposed along the outer cylinder and crossing the reinforcing ribs; and a plurality of intermediate ribs which connect the outer cylinder and the intermediate cylinder in such a manner that at least one intermediate rib is disposed between adjacent reinforcing ribs.

DESCRIPTION OF THE PREFERRED EMBODIMENTS

The invention will be described in detail with reference to a preferred embodiment shown in the accompanying drawings.

Figure 1:
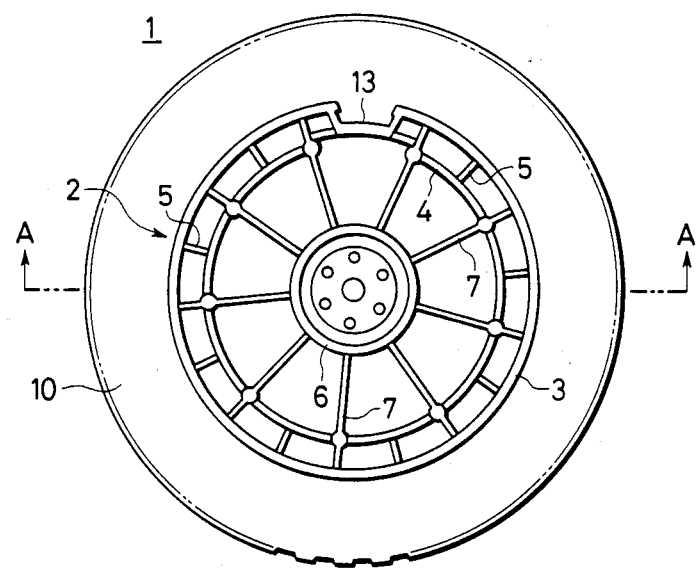
FIG. 1 is a plan view showing a preferred embodiment of a reel of the invention.
Figure 2:
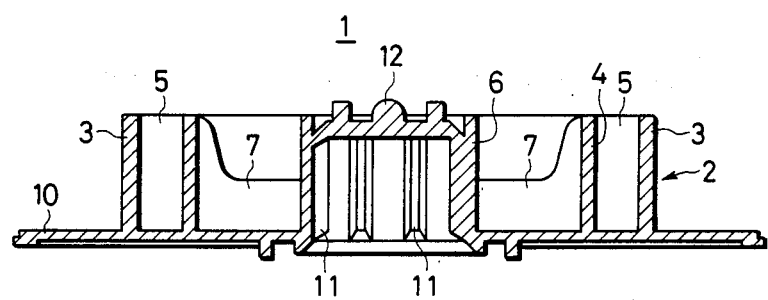
FIG. 2 is a sectional view taken along a line A—A in FIG. 1.

FIG. 1 is a plan view of a preferred embodiment of a cassette tape reel of the invention, and FIG. 2 is a sectional view taken along a line A—A in FIG. 1. As conductive to an understanding of the invention, one of the flanges (i.e., the upper flange) is not shown in FIGS. 1 and 2.

Basically, the reel 1 according to the invention comprises: a tape winding drum 2 on which a magnetic tape is wound, and the upper and lower flanges 10 (only the lower flange being shown) provided for preventing the magnetic tape from being wound irregularly. The tape winding drum 2 is composed of an inner cylinder 6 having pawls 11 which are engaged with a rotating shaft of a magnetic tape recording and reproducing device, an outer cylinder 3 which is coaxial with the inner cylinder 6 and provides a tape winding cylindrical wall, a plurality of reinforcing ribs 7 extending radially of the reel to connect the outer and inner cylinders 3 and 6, an intermediate cylinder 4 provided coaxially with the outer cylinder 3 and crossing the reinforcing ribs 7, and a plurality of intermediate ribs 5, each extending radially of the reel between adjacent reinforcing ribs, thus connecting the outer cylinder 3 and the intermediate cylinder 4. A protrusion 12 is provided at the center of the upper surface of the inner cylinder 6. The protrusion 12 is engaged with a reel retaining leaf spring. The outer cylinder 3 has a recess 13 in which a tape end locking clamp is fitted.

The reel 1 thus constructed is formed by injection-molding of molten plastic resin. As above, after the reel is taken out of the metal mold, the resin contracts as the temperature decreases. In the conventional reel, the contraction is relatively large at the radially extending reinforcing ribs. However, in the reel of the invention, due to the provision of the intermediate cylinder 4, the effect of the contraction of the reinforcing ribs 7 on the outer cyllinder is decreased. Since the intermediate cylinder 4 has a smaller thickness than the reinforcing ribs 7, the former is cooled and solidified earlier than the latter, thus suppressing the contraction of the ribs 7.

With respect to the contraction of the reinforcing ribs 7, the contraction of the parts inside the intermediate cylinder 4 is suppressed by the intermediate cylinder 4. However, the parts outside the intermediate cylinder 4 act to pull the outer cylinder 3 towards the reel center, thereby to collapse the outer cylinder 3. On the other hand, the intermediate ribs 5 act also to pull the outer cylinder 3 towards the reel center. Therefore, the concentration of the entire outer cylinder 3 towards the reel center is substantially uniform.

Because the tape winding drum 2 has the intermediate cylinder 4 and the intermediate ribs 5 as described above, a number of air vents can be formed in the metal mold, and formation of welds (in which the flowing of molten resin is insufficient) in the tape winding drum 2 and in its vicinity is therefore suppressed.

The reel 1 may be made of acrylonitrile butadiene styrene (ABS) resin, acrylonitrile styrene (AS) resin or polypropylene (PP) resin, as in the conventional reel, or it may be made of a plastic resin such as polyacetal (POM), which undergoes a relatively large amount of contraction after being molded. The latter does though offer a high wear resistance.

In the above-described embodiment, one intermediate rib 5 is provided between two adjacent reinforcing ribs 7. However, the invention is not limited thereto or thereby, that is, a plurality of intermediate ribs 5 may be provided between two adjacent reinforcing ribs 7.

The invention has been described with reference to a reel used for a video tape cassette, but it should be noted that the invention is not limited thereto or thereby, that is, the technical concept of the invention can be applied to reels employed in other magnetic tape cassettes.

As described above, according to the invention, the reel has the intermediate cylinder 4 and the intermediate ribs 5, and therefore the deformation (or the contraction towards the reel center) of the outer cylinder 3 due to the concentration of the ribs 5 and 7 is made uniform over the entire outer cylinder 3, with the result that the circularity of the tape winding cylindrical wall is improved.

In the reel 1 of the invention, the intermediate cylinder 4 and the intermediate ribs 5 are provided, and the formation of welds is prevented. Accordingly, the reel 1 is more durable against external forces than the conventional reel, which makes it possible to reduce the wall thickness of the reel.

In the reel of the invention, the circularity of the tape winding drum 2 is maintained by the provision of the intermediate ribs 5, which experience substantially the same amount of contraction as the reinforcing ribs 7 when cooled after molding. Therefore, the reel 1 may be made of a plastic resin such as POM, although heretofore POM has been regarded unsuitable as a material for forming the tape winding drum because, although it has a high wear resistance, it contracts relatively greatly after molding. Thus, according to the invention, the tape winding drum 2, which has an excellent wear resistance, can be formed as an integral unit, which simplifies the manufacture of the reel 1.

I claim:

1. A unitary molded plastic magnetic tape reel on which a magnetic tape is wound, said reel including a tape winding drum, said drum comprising:
   an inner cylinder, an outer cylinder provided outside said inner cylinder coaxial with said inner cylinder and spaced radially therefrom, said outer cylinder defining a tape winding cylindrical wall;
   a plurality of reinforcing ribs extending radially of said reel to connect said outer cylinder to said inner cylinder;
   an intermediate cylinder disposed inside said outer cylinder and intersecting said reinforcing ribs; and
   a plurality of intermediate ribs extending radially between and connected to said outer cylinder and said intermediate cylinder in such a manner that at least one intermediate rib is disposed circumferentially between and at least partially axially coextensive with adjacent reinforcing ribs whereby the presence of the intermediate ribs acts to pull the outer cylinder towards the reel center along with the full radial reinforcing ribs such that the distribution of the pulling force acting by shrinking of the full radial reinforcing ribs is substantially uniform throughout the outer cylinder and with deformation of the drum further resisted by the presence of the intermediate cylinder during molding of the unitary plastic magnetic tape reel as the plastic cools and solidifies.

2. The magnetic tape reel as claimed in claim 1, in which said intermediate cylinder has a smaller wall thickness than the thickness of said reinforcing ribs such that during plastic molding of the drum the intermediate cylinder cools and solidifies earlier than the reinforcing ribs to suppress the subsequent radial contraction of the full radial reinforcing ribs.

3. The magnetic tape reel as claimed in claim 1, wherein said molded plastic reel is made of a material selected from the group consisting of acrylonitrile butadiene styrene resin, acrylonitrile styrene resin, and polypropylene resin.

4. The magnetic tape reel as claimed in claim 1, wherein said reel is made of a polyacetal plastic resin.

* * * * *